United States Patent [19]

Takabayashi

[11] Patent Number: 5,006,425
[45] Date of Patent: Apr. 9, 1991

[54] METHOD AND APPARATUS FOR CONTROLLING THE TEMPERATURE OF A REFORMING REACTION CATALYST

[75] Inventor: Yasuhiro Takabayashi, Kawasaki, Japan

[73] Assignee: Fuji Electric Co., Ltd., Kawasaki, Japan

[21] Appl. No.: 414,518

[22] Filed: Sep. 29, 1989

[30] Foreign Application Priority Data

Oct. 7, 1988 [JP] Japan ................................. 63-251983
Sep. 7, 1989 [JP] Japan ................................. 1-230359

[51] Int. Cl.$^5$ ................................................. H01M 8/04
[52] U.S. Cl. .......................................... 429/23; 429/24; 429/19
[58] Field of Search ......................... 429/22, 23, 24, 19

[56] References Cited

U.S. PATENT DOCUMENTS

| | | | |
|---|---|---|---|
| 3,432,356 | 3/1969 | Christianson | 429/22 |
| 3,539,397 | 11/1970 | Keating et al. | 429/23 |
| 4,904,548 | 2/1990 | Tajima | 429/22 |

Primary Examiner—Stephen J. Kalafut
Attorney, Agent, or Firm—Spencer & Frank

[57] ABSTRACT

A method and an apparatus for controlling the temperature of a reforming reaction catalyst in which a reforming gas to be supplied to a fuel cell is produced by allowing it to react against a catalyst so that the fuel cell can provide output power to be supplied to a load. The present temperature for the reforming reaction catalyst may be modified in response to any variations in the load condition so that the amount of the combustion air output from the reforming burner can be reduced. The temperature control sequence for the reforming reaction catalyst may be performed near to the equilibrium point of the endothermic reaction following the catalytic reaction, thereby minimizing any variation that may occur in the catalyst temperature, and protecting the catalyst against its degradation. The temperature control sequence may be triggered at the time when the catalyst temperature has reached within the temperature setting range, thereby ensuring that the temperature control sequence can proceed stably and reliably.

22 Claims, 12 Drawing Sheets

METHOD AND APPARATUS FOR CONTROLLING THE TEMPERATURE OF A REFORMING REACTION CATALYST

BACKGROUND OF THE INVENTION

1. Field of the Invention

The present invention relates to a method of and an apparatus for controlling the temperature of a reforming reaction catalyst for use with a power generator system that includes a fuel cell, in which a material for reforming such as methane, methanol, naphtha, and the like passes through a reformer which produces hydrogen gas from any of the material for reforming so as to be supplied to the fuel cell.

2. Description of the Prior Art

A conventional apparatus for controlling the temperature of a reforming reaction catalyst has an arrangement such as that shown in FIG. 1, and is specifically designed to control the rate of any material for reforming and combustion air to be supplied, thereby controlling the temperature of the reforming reaction catalyst.

Referring to FIG. 1, a reformer 1 accepts any material for reforming such as the one composed of a mixture of methanol and water, which will have passed through a material for reforming delivery pump 2 that delivers it to the reformer 1. The reformer 1 produces hydrogen gas by causing the reforming reaction. When hydrogen gas is produced, it is supplied to a fuel cell (FC) 3. Then, the FC3 produces a direct current (DC) power to be supplied to a transforming device 4 which usually has the form of an inverter. The transforming device 4 converts the DC power into an alternating current (AC) power to be supplied to any particular load 5.

The reforming process for the material for reforming consists usually of raising the temperature of any suitable reforming reaction catalyst 6 such as an alloy of Fe and Cu up to a certain value, followed by feeding the material for reforming into the reformer 1. The reforming reaction catalyst 6, which is usually provided in the granular forms, is filled in a reforming tube 7 which usually has the form of a hollow cylindrical pipe. The reforming reaction catalyst 6 is heated by the burner 8 through a heating medium such as oil. That portion of the material for reforming which has been produced as non-reaction reforming gas within FC3 is fed as off-gas fuel to the burner 8. The combustion air is fed through its blower 9 to the burner 8.

The temperature that occurs during the reforming reaction within the reformer 1, that is, the temperature of the reforming reaction catalyst 6, is sensed by a temperature sensor 11 which usually has the form of a thermocouple.

A signal 101 which represents the temperature as sensed by the sensor 11 is compared with the specific temperature value preset by a temperature setter 12 in the form of a variable resister, and any deviation of the temperature signal from the temperature setting is determined. If the temperature as sensed by the temperature sensor 11 is below the temperature setting, a signal 102 that represents the above deviation is inputted to a temperature regulator ($CT_1$) 13 where it is amplified.

The FC3 provides its output current which corresponds to the value of the load 5, and this FC output current may be detected by a current detector (14) usually in the form of a current transformer. A signal 103 that is indicative of the current as detected is inputted to a load regulator ($CT_2$) 15 in the form of an amplifier where it is amplified. The load regulator 15 changes the output current from the FC3 to provided the corresponding current that can affect the rate of the material for reforming and combustion air to be supplied. The output current from the FC3 increases with the increasing value of the loads, but as the reforming reaction, is the endothermic reaction, the temperature of the reforming reaction catalyst 6 lowers.

An output signal 104 that is outputted from the temperature regulator 13 and whose value has been amplified, and an output signal 105 that is outputted from the load regulator 15 and whose value has been amplified are inputted to a material delivery pump ($CT_3$) controller 16 and to a combustion air blower ($CT_4$) controller 17, respectively, both controllers usually having the form of a chopper. Each of those controllers 16 and 17 may control its respective voltage variably to be applied across a respective DC motor associated with the pump 2 and blower 9. The output voltages of the controllers may influence the number of revolutions for the respective DC motors so that the associated pump 2 and blower 9 can provide the appropriate amounts of material for reforming and combustion air to the reformer 1. That is, when the condition of the load 5 changes and the temperature of the reforming reaction catalyst 6 changes, the rates of the material for reforming and combustion air to be supplied are changed accordingly, respectively, keeping the temperature of the reforming reaction catalyst 6 at the constant value.

The whole control of the fuel cell power generator system is provided by a control program, which is stored in a memory located within a central controller which is not shown. Specifically, the temperature regulator 13, load regulator 15, material delivery pump controller 16 and combustion air blower controller 17 may be operated under control of the central controller or its control program.

Another conventional control apparatus, shown in FIG. 2, which also allows the temperature of a reforming reaction catalyst to be controlled is designed to control the temperature of the reforming reaction catalyst by controlling the rate of a promoter fuel and the rate of a combustion air variably. In FIG. 2, those locations which are similar to those in FIG. 1 are given the same reference numerals. Reference numeral 10 represents promoter fuel delivery pump which may be operated if the amount of the off-gas to be supplied from FC3 to the burner 8 is not enough to satisfy the specific combustion requirements, and will provide an additional amount of fuel.

The signal 104 outputted from the temperature regulator 13 is inputted to the promoter fuel delivery pump 10 and to the combustion air blower controller 17. The signal outputted from the load regulator 15 is inputted to the material for reforming delivery pump controller 16 and to the combustion air blower controller 17.

The amount of the material for reforming that will be supplied to the reformer 1 through the material for reforming delivery pump 2 is controlled by the for the material for reforming delivery pump controller 16 in response to the signal 105.

The DC motor associated with the promoter fuel delivery pump 10 may provide a variable number of revolutions in response to the signal 104, and the amount of fuel to be added to the reforming burner 8 through the pump 10 may be determined as appropriate, depending upon the particular number of revolutions.

The amount of air to be supplied to the reforming burner 8 through the combustion air blower 9 may be controlled by the combustion air blower controller 17 which responds to the signal 104 or 105. The combustion air that will be supplied to the reforming burner 8 may be adjusted to the amount of promoter fuel that is to be supplied in response to any changes in the reforming reaction catalyst temperature. In this way, the reforming reaction catalyst 6 may be kept to its constant temperature.

It may be appreciated from FIG. 1 that if the FC3 should provide output that can meet the particular power requirements for the load 5, the reformer 1 must produce the amount of hydrogen gas sufficient to satisfy those requirements. That is, whether the amount of material for reforming to be supplied is to be increased or decreased may essentially depend upon the output current value of the fuel cell.

As described earlier, the catalytic reaction that occurs within the reformer 1 is the endothermic reaction, the temperature of the reforming reaction catalyst 6 falls as the catalytic reaction progresses. This may be explained by using FIGS. 3A, 3B and 3C.

In FIG. 3A, the pump 2 is operated to deliver the amount of a material for reforming that can meet the particular power requirements of the load 5 into the reforming tube 7 within the reformer 1 on its inlet. Then, the catalytic reaction occurs between the reforming reaction catalyst 6 and the material for reforming. As this catalytic reaction progresses, it produces hydrogen gas which goes out of the reforming tube 7 on its outlet. Under the initial light load condition, that is, when the amount of the material for reforming to be supplied to the reformer 1 is small, the catalytic reaction will occur near the point A. Subsequently, as the load 5 is increasing, the amount of the material for reforming to be supplied to the reformer 1 is increasing accordingly. Then, the reaction will occur between all of the reforming reaction catalyst 6 and the increased amount of the material for reforming throughout the reforming tube 7.

As it may be seen from FIG. 3B, therefore, the temperatures $T_A$, $T_B$ and $T_C$ of the reforming reaction catalyst 6 which appear at the different points A, B and C are changing in response to the variations in the load condition. The curves which are identified by reference numerals 25, 50, 75 and 100 in FIG. 3B explain the relationships between the locations where the reaction occurs throughout the reforming tube 7 and the corresponding changes in the temperature, when the load 5 is placed at 25%, 50%, 75% and 100% of its rated value, respectively. Again, as described earlier, the reforming reaction is the endothermic reaction, temperature of the reforming reaction catalyst 6 decreases gradually as the load 5 is increasing.

How the temperatures at the points A, B and C change under the different load conditions is shown in FIG. 3C. At the point A which is located the nearest to the burner 8, the temperature of the reforming reaction catalyst 6 is rising under the light load condition, and is falling as the reforming reaction progresses under the heavy load condition. A relatively great change in the temperature may be noticed. As the reforming reaction is gradually going down through the reforming tube 7, beginning with the point A through the point B and ending with the point C, the change in the temperature of the reforming reaction catalyst 6 that may be caused by the load 5 tends to become smaller.

As the catalytic reaction which occurs within the reformer 1 is accompanied by the endothermic reaction, the temperature of the reforming reaction catalyst 6 may have the greater reduction as the load 5 is placed under the heavier condition. In this respect, the conventional temperature control method, whereby the control is only provided to ensure that the catalyst 6 is kept to its constant temperature under the different load conditions, has the problems which may be listed as follows:

(1) Because of a drop in the temperature of the catalyst that occurs during the reforming reaction process, an additional amount of the material for reforming must be added into the reformer 1 in order to keep the temperature constant. Unless any additional material for reforming is added, the catalyst will have its temperature falling gradually along the curve P shown in FIG. 4. As the material for reforming to be added in increasing, the produced off-gas is also increasing with the result that the amount of combustion air to be added must also be increased as seen from FIG. 4. This may degrade the running efficiency of the plant facilities.

(2) As it may be seen from FIG. 4, if the amount of material for reforming to be added is to be increased further as noted in (1) described above, in an attempt to keep the catalyst temperature constant, it may cause a further drop in the catalyst temperature. In the positive feedback control, oscillations may be produced as explained by the principle of the feedback control. Those oscillations may make the temperature control for the reforming reaction catalyst 6 unstable and unreliable, and the catalyst temperature may have a great change which may degrade the catalyst's performance.

(3) When the load 5 is decreasing, the burner 8 will have been supplying a great deal of combustion heat until the moment when the load 5 has actually decreased. In such case, the catalyst temperature will overshoot, which may possible cause the degradation in the catalyst performance, or shorten its life. This is also seen in FIG. 4.

(4) The reforming reaction catalyst 6 has a very large time constant (such as between several minutes and several ten minutes) when its temperature is changing, and a great difference in the temperature is also noticed at the points A, B and C shown in FIG. 3A. Specifically, the temperature may change more rapidly in the area which is located nearer to the point A, whereas it may change more slowly in the area located nearer to the point C. Any attempt to keep the catalyst temperature constant under those circumstances might fail because there is a timing delay in detecting any change in the catalyst temperature. Thus, the temperature control cannot be achieved with high precision.

SUMMARY OF THE INVENTION

An object of the present invention is to provide a control method and a control apparatus wherein the catalyst temperature control can be achieved with high precision, so that the problems described above are eliminated.

In order to achieve the above object, according to the present invention, there is provided a reforming reaction catalyst temperature control method in which a reforming gas to be supplied to a fuel cell is produced by allowing the reforming gas to react against a reforming reaction catalyst, so that the fuel cell can provide output power to be supplied to a load, in which the method comprises the steps of:

detecting the temperature of the reforming reaction catalyst during the catalytic reaction process;

detecting any current flow from the fuel cell to the load;

setting a value for the catalyst temperature that may vary depending upon the load condition as well a temperature control range that is determined from the set value for the catalyst temperature on the basis of a relationship between the variations in the load and the corresponding variations in the catalyst temperature;

determining any deviation that occurs between the set value for the catalyst temperature and the detected catalyst temperature by calculating the deviation; and starting controlling of the temperature for the catalyst when the deviation has reached within the temperature control range.

Here, the step of detecting the temperature of the reforming reaction catalyst may include sensing the temperature by using a thermocouple.

The step of detecting any current flow from the fuel cell to the load may include detecting any current flow by means of a Hall CT.

The step of starting controlling of the temperature for the reforming reaction catalyst may include starting controlling of the temperature by using means that includes a temperature regulator, a material for reforming delivery pump controller, and a combustion air blower controller.

The temperature regulator may include a polarity discriminator and a plurality of operational amplifiers.

Each of the materials for reforming delivery pump controllers and the combustion air blower controllers may comprise an arithmetic element, a pulse width modulator and a power element.

The arithmetic element may comprise a function generator in the form of CPU, an operational amplifier and a resistor.

The step of starting controlling of the temperature control sequence for the reforming reaction catalyst may be performed by using means that includes a temperature regulator, a promoter fuel delivery pump controller and a combustion air blower controller.

The temperature regulator may include a polarity discriminator and a plurality of operational amplifier.

Each of the promoter fuel delivery pump controller and the combustion air blower controller may comprise an arithmetic element, a pulse width modulator and a power element.

The arithmetic element may comprise a function generator in the form of CPU, an operational amplifier and a resistor.

In a reforming reaction catalyst temperature control apparatus in which a reforming gas to be supplied to a fuel cell is produced by allowing the reforming gas to react against a reforming reaction catalyst, so that the fuel cell can provide output power to be supplied to a load, an apparatus according to the present invention comprises:

first detector means for detecting the temperature of the reforming reaction catalyst during the catalytic reaction process;

second detector means for detecting any current from the fuel cell to the load;

means for setting a value for the catalyst temperature that may vary depending upon the load condition as well a temperature control range that is determined from the set value for the catalyst temperature on basis of a relationship between the variations in the load and the corresponding variations in the catalyst temperature;

means for determining any deviation that occurs between the set value for the catalyst temperature and the detected catalyst temperature by calculating the any deviation; and means for starting controlling of the temperature for the catalyst when the any deviation has fallen within the temperature control range.

Here, the first detector means may be a thermocouple.

The second detector means may be a Hall CT.

The means for starting controlling of the temperature may include a temperature regulator, a reforming material delivery pump controller and a combustion air blower controller.

The temperature regulator may include a polarity discriminator and a plurality of amplifier.

Each of the reforming material delivery pump controller and the combustion air blower controller may comprise an arithmetic element, a pulse width modulator and a power element.

The arithmetic element may comprise a function generator in the form of CPU, an operational amplifier, and a resistor.

The means for starting controlling of the temperature may include a temperature regulator, a promoter fuel delivery pump controller and a combustion air delivery blower controller.

The temperature regulator may include a polarity discriminator and a plurality of operational amplifier.

Each of the reforming material delivery pump controller and the combustion air blower controller may comprise an arithmetic element, a pulse width modulator and a power element.

The arithmetic element may comprise a function generator, an operational amplifier and a resistor.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Embodiment 1

Figure 1:
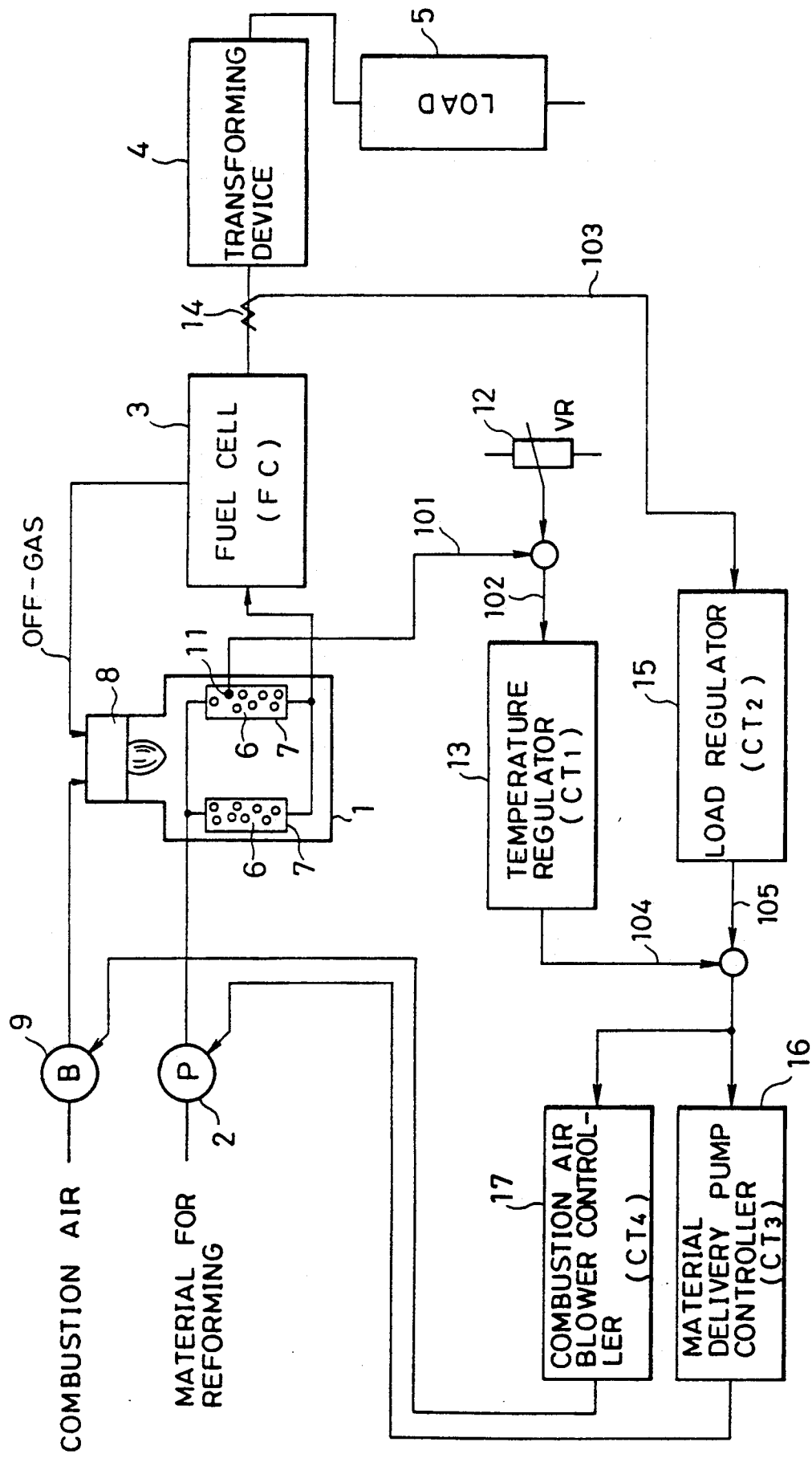
FIG. 1 is a schematic diagram showing the arrangement of a conventional apparatus that controls the temperature by varying the rates of the material for reforming and the combustion air to be supplied.
Figure 2:
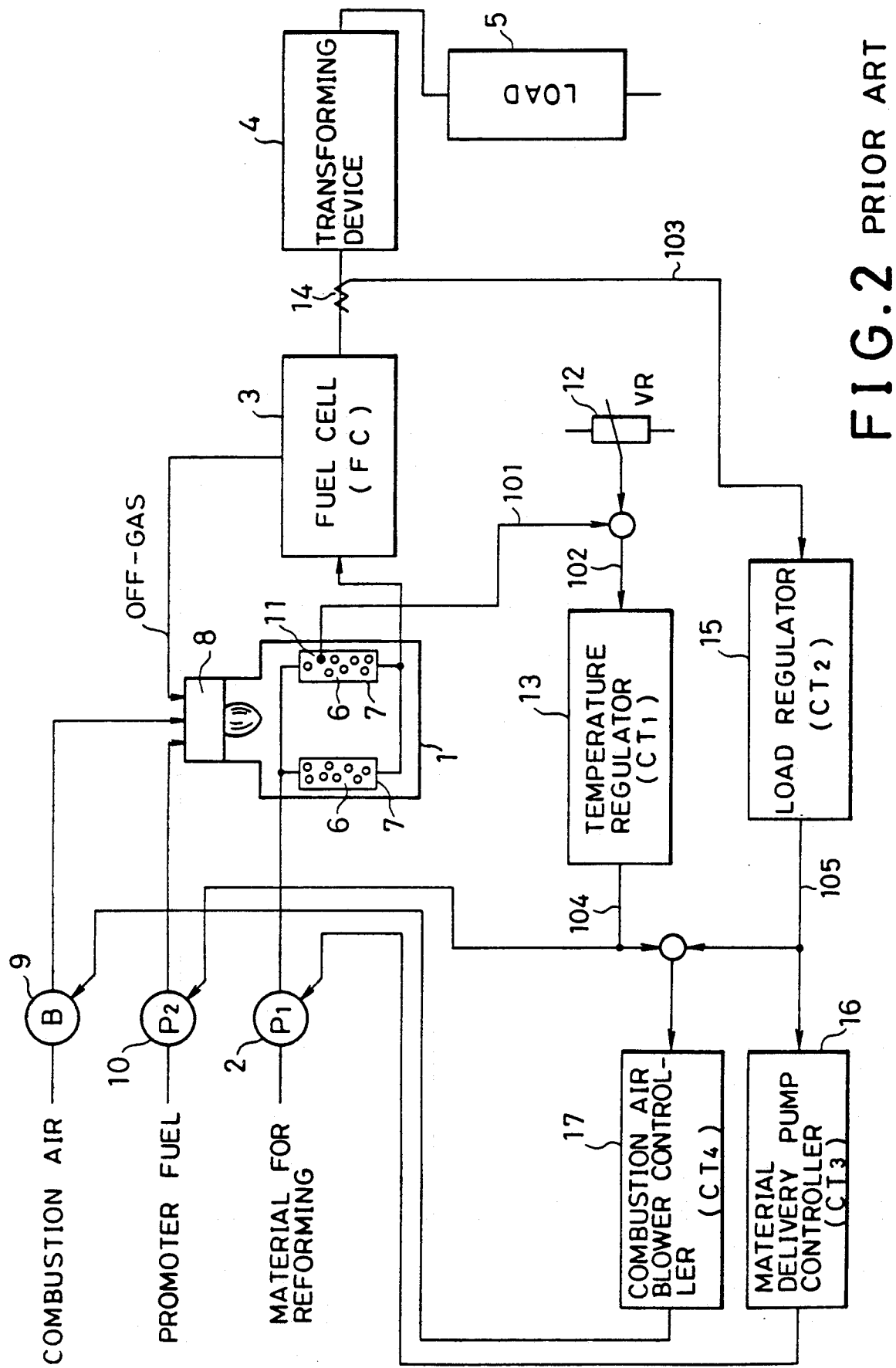
FIG. 2 is a schematic diagram showing the arrangement of another conventional apparatus that controls the temperature by varying the rates of the promoter fuel and the combustion air to be supplied.
Figure 5A:
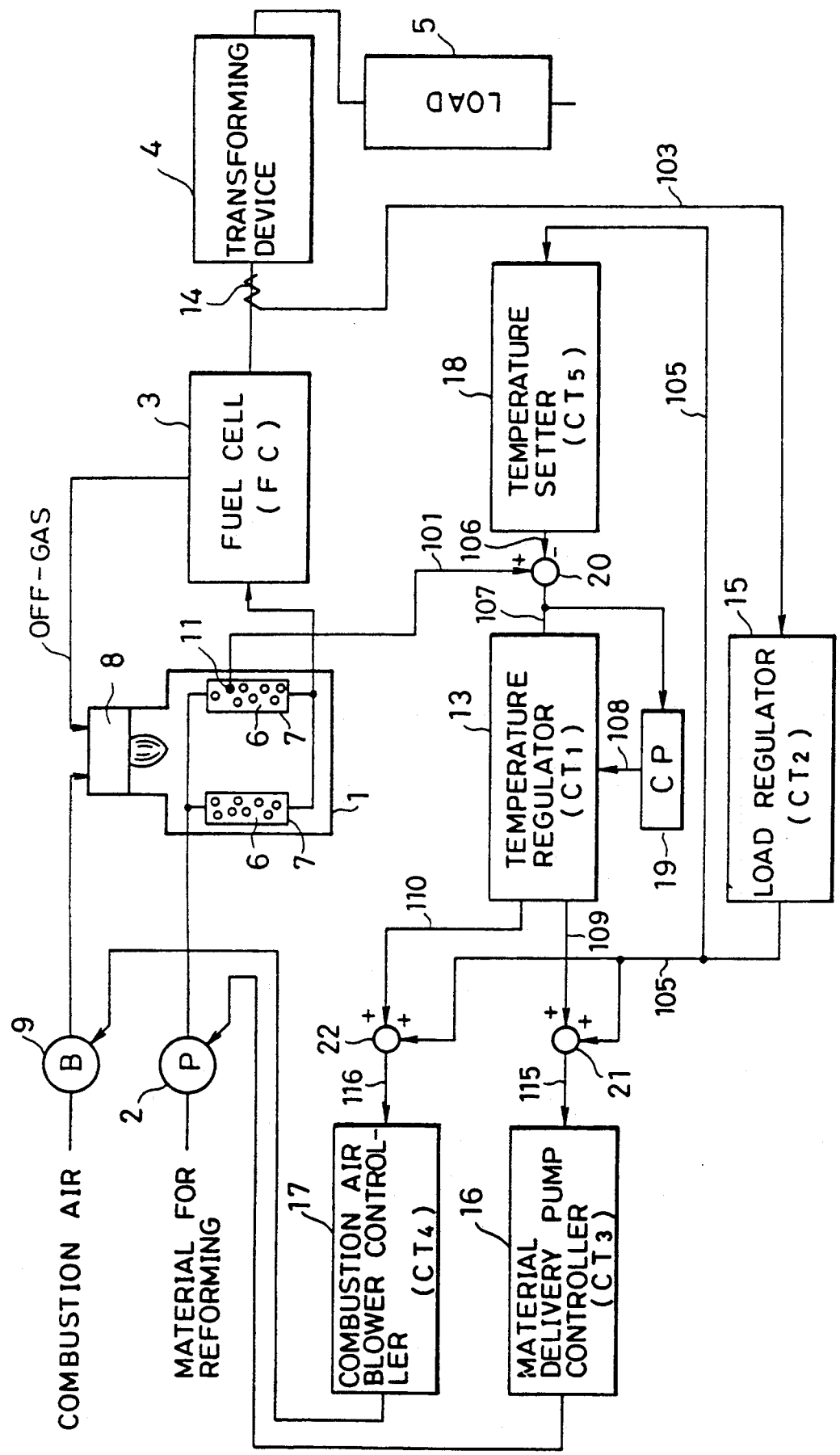
FIGS. 5A, 5B and 5C are schematic diagrams showing the arrangement of the apparatus in a first preferred embodiment of the present invention that controls the temperature by varying the rates of the material for reforming and the combustion air to be supplied.
Figure 5B:
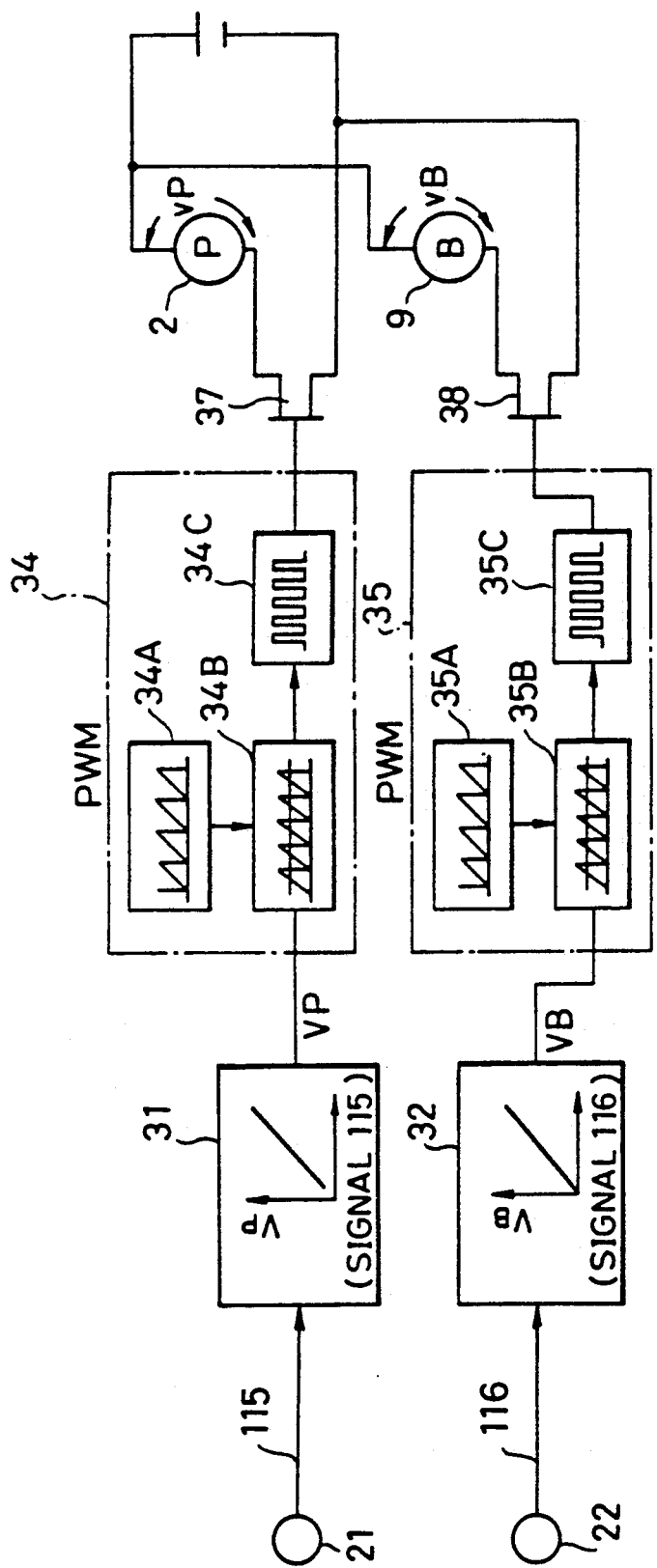
Figure 5C:
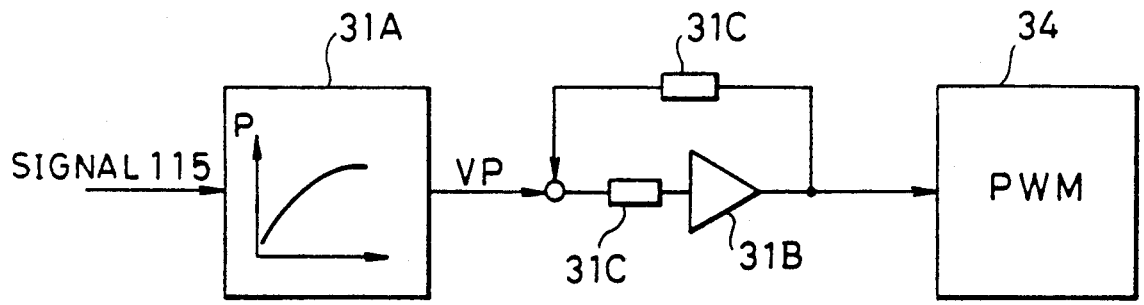
Figure 5D:
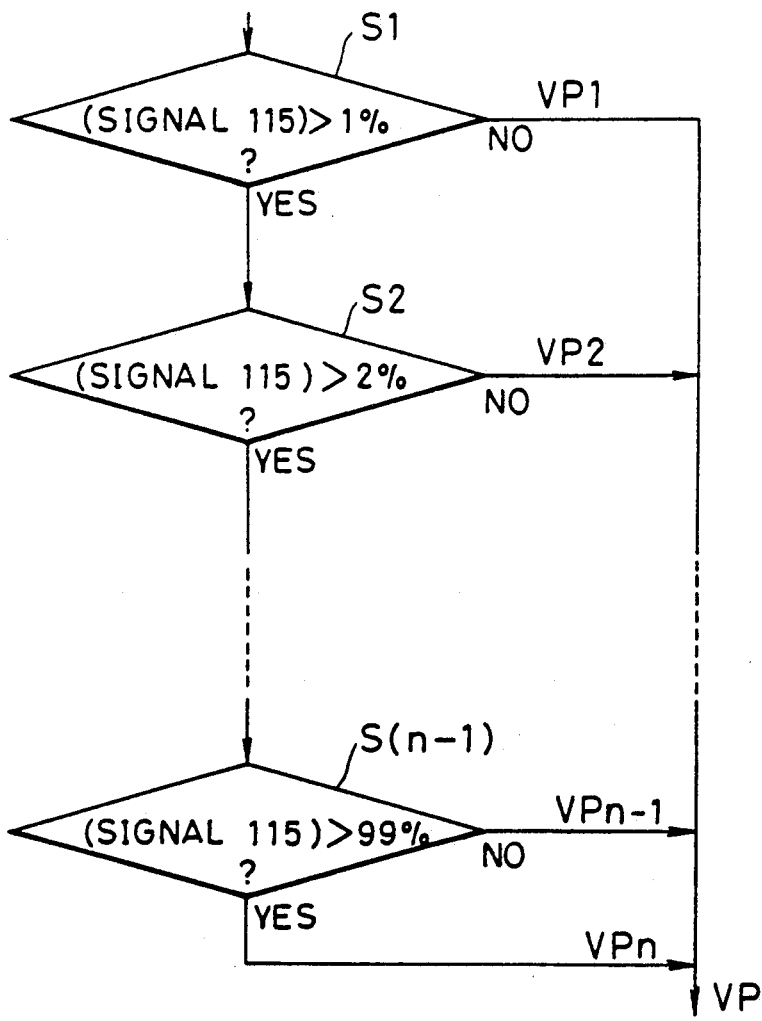
FIG. 5D is a flowchart of the control steps to be followed by the apparatus shown in FIG. 5C.
Figure 6:
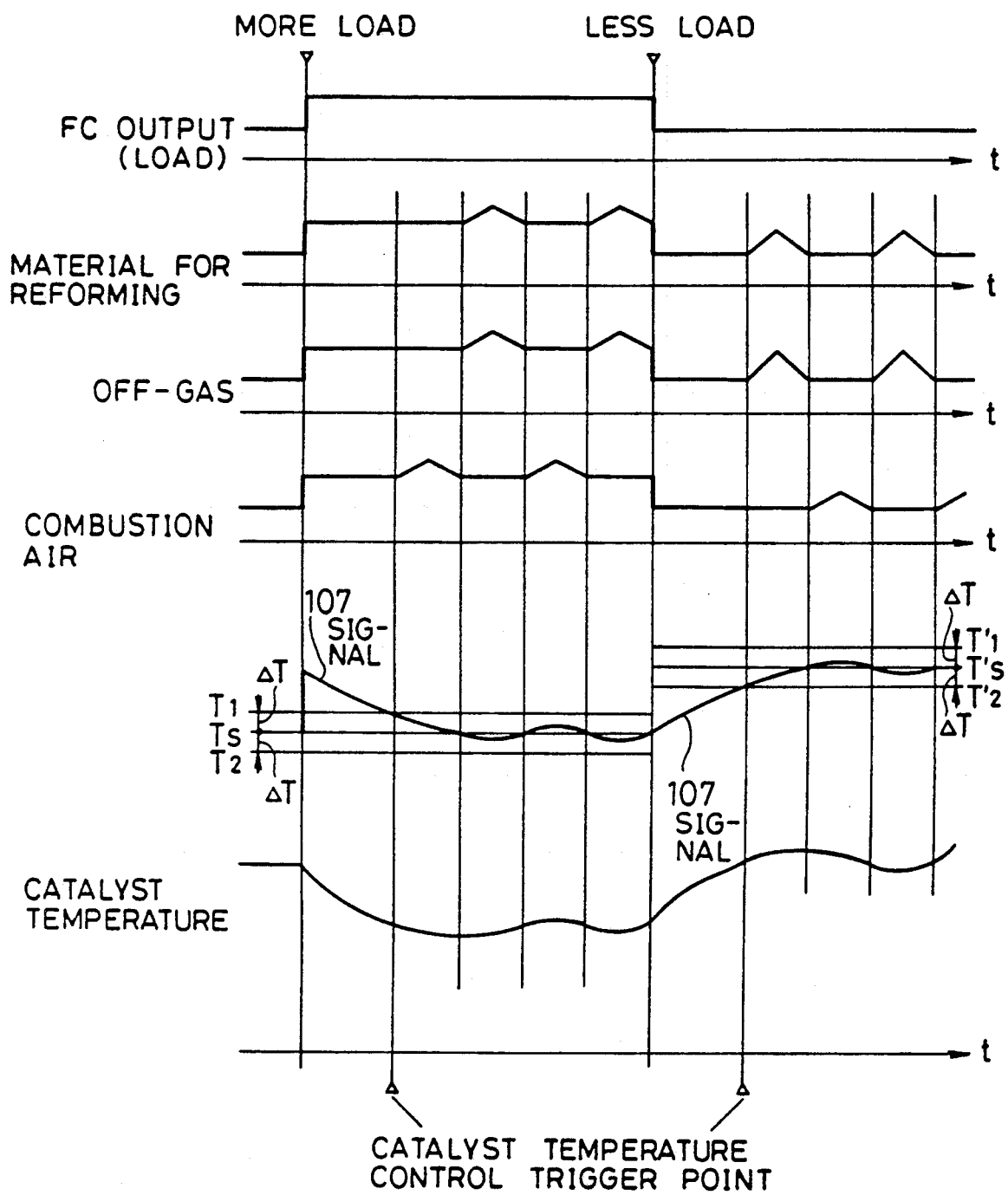
FIG. 6 is a timing chart illustrating the operation of the apparatus shown in FIGS. 5A, 5B and 5C.

Referring first to FIGS. 5A, 5B and 5C, there is the arrangement of the apparatus according to the first embodiment of the present invention. Referring then to FIG. 5D, there is a flowchart that depicts the control sequence associated with the operation of the apparatus shown in FIG. 5C. Finally, FIG. 6 is a timing chart that explains the operation sequence of the apparatus. The catalyst temperature control according to the first embodiment is specifically provided by varying the rates of the material for reforming and the combustion air to be supplied. Those locations in FIG. 5A which are similar to those in FIGS. 1 and 2 are identified by the same reference numerals.

As the load 5 is increasing, the output current of the fuel cell (FC) 3 is also increasing. The output current from the FC3 is detected by the current detector 14, which provides a detect signal 103 to be inputted to the load regulator 15 ($CT_2$). As it may be seen from FIG. 6, the output current from the FC3 increases with the increasing load 5. In response to the input signal 103, the load regulator 15 provides an amplified output signal 105, which is inputted to the combustion air blower controller 17 ($CT_4$) and to the material delivery pump controller 16 ($CT_3$). In response to the input signal 105, the controllers 17 and 16 enable the respective motors associated with the combustion air blower 9 and material delivery pump 2 to provide the respective numbers of revolutions required to cause the blower 9 and pump 2 to supply the respective amounts of the material for reforming and combustion air which can meet the requirements for the load 5. Those amounts are supplied to the reformer 1, respectively.

FIG. 5B shows the arrangement for the material delivery pump controller 16 (shown in FIG. 5A) and the arrangement for the combustion air blower controller 17 (shown in FIG. 5A). Referring then to FIG. 5B, reference numerals 31 and 32 represent arithmetic elements that perform their respective operations required to control their respective material delivery pump 2 and combustion air blower 9. FIG. 5C shows the construction of the arithmetic element 31, and FIG. 5D depicts an example of the control procedures to be followed by the arithmetic element 31.

In FIG. 5C, a function generator 31A is implemented by a central processing unit (CPU). There are also an operational amplifier 31B and a resistor 31C. An adder 21 (shown in FIG. 5A) provides a signal 115 to the arithmetic element 31 (shown in FIG. 5A), which uses the value represented by this signal as a reference, and enables the function generator 31A to provide a certain function $V_p$. (Reference numeral 34 is a pulse width modulator.)

The control procedures that are followed by the operating unit 31 are now described in accordance with the flowchart in FIG. 5D. In step S1, the testing occurs to check the value represented by the signal 115 from the adder 21 in not less than 1% or not. If it is not more than 1%, the voltage signal $V_p$ which is equal to $V_p = V_{p1}$ is provided to a pulse width modulator 34. If the value (the signal 115) is not less than 1%, proceeding to the following step S2, and it judges whether the value (the signal 115) is not less than 2% or not. The similar procedures will follow one after another where the similar judgement is made occurs for the value (signal 115) until the step of S(n−1) is reached. Similarly, each step will provide the voltage signal $V_p$ to the pulse width modulator 34, each voltage signal representing the result of the judgement.

The above description, which has been provided for the voltage signal $V_p$ which enables the material delivery pump 2, may also apply for the voltage signal $V_B$ which enables the combustion air blower 9.

It should be noted that there are no linear proportional relationships between the (signal 115) value and (signal 116) value and the corresponding voltage $V_p$ and $V_B$, respectively, and instead those provide the voltage of $V_p = f_1 \cdot$(signal 115) and the voltage of $V_B = f_2 \cdot$(signal 116). As an alternative method, therefore, CPU 31A may calculate $V_p$, and the arithmetic element 32 or CPU (not shown) may calculate $V_B$.

Referring now to FIG. 5B, there are pulse width modulators 34 and 35, which include oscillators 34A, 35A each of which provides a sawtooth waveform signal output, comparators 34B, 35B, and pulse generators 34C, 35C, respectively. Each of the comparators 34B, 35B provides output when the level of each sawtooth waveform signal output is above that of each voltage signal which has been applied to the comparator from each arithmetic element 31, 32. Each of the pulse generators 34C, 35D provides a rectangular waveform pulse in response to the output of each comparator.

There are also power elements 37, 38 which may be implemented by large power bipolar transistors or power MOSFET. Each of the power elements 37, 38 may be enabled in response to the output pulse of each respective pulse generator 34C, 35C.

The voltage signals $V_p$ and $V_B$ outputted from the arithmetic elements 31, 32 are inputted to the respective corresponding comparators 34B, 35B, respectively. The output pulse of each pulse generator 34C, 35C has a width which is determined by the level of each voltage signal. The pulses outputted from each pulse generator 34C, 35C appears as PWM signal, which is inputted to each respective power element 37, 38. The frequency of the sawtooth waveform signal from each oscillator 34A, 35A determines the frequency at which the switching action occurs for each power element 37, 38.

The pulse generated from each of the pulse generators 34C, 35C has a narrow width when the output power from the FC3 later to be described is small, that is, the (signal 115) value and the (signal 116) value are small; consequently, the period of time during which the power elements 37, 38 are conductive is short. Therefore, the driving motors (not shown) which are provided for driving their associated material delivery pump 2 and combustion air blower 9 will only be active for the short period of time. Each driving motor can have its reduced number of revolutions, which may provide less the material and the combustion air supplies.

Conversely, when the output power of the FC3 is large, the output pulse of each of the pulse generators 34C, 35C will have a large pulse width. Thus, the rates of the material and the combustion to be supplied will be increased conversely to the above case.

As it may be appreciated from the above, the output signal, or PWM signal, from each of the pulse width modulators 34, 35 enables each power element 37, 38 to be switched, and this switching action varies the voltages $V_p$ and $V_B$ to be applied across the respective driving motors so that the output of the associated pump 2 and blower 9 can depend upon the particular number of revolutions for each motor.

Figure 3A:
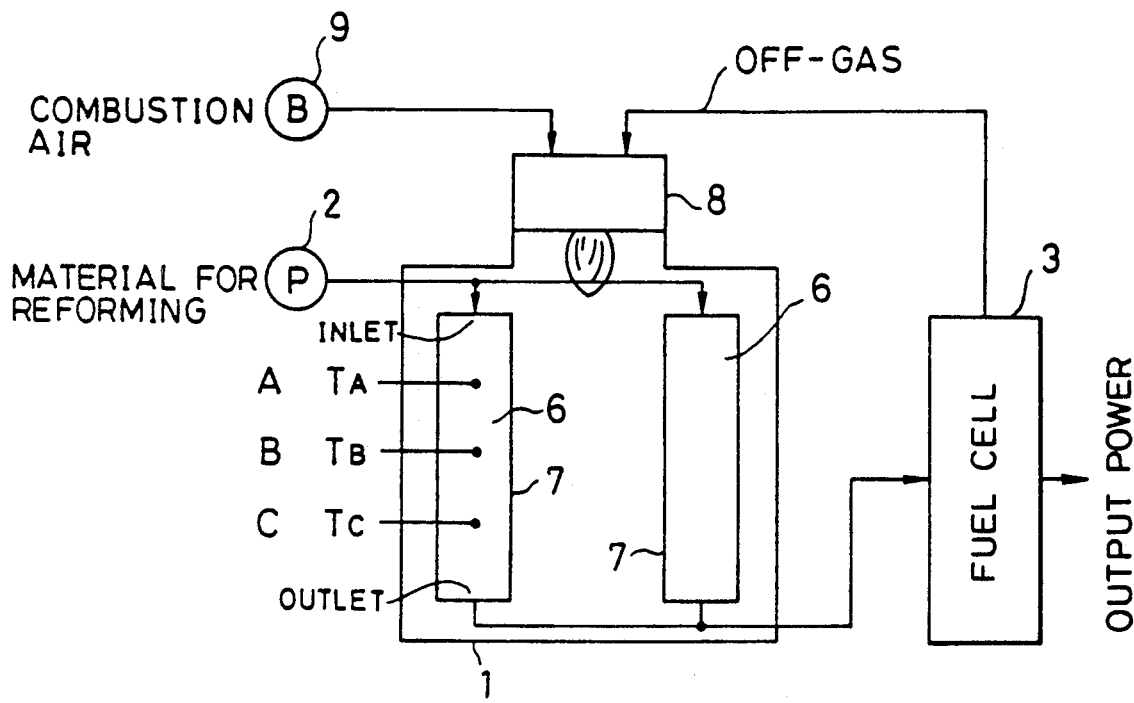
FIGS. 3A, 3B and 3C are provided to explain the arrangement of the reformer as well as how the catalyst temperature will be have at the different locations and under the different load conditions.
Figure 3B:
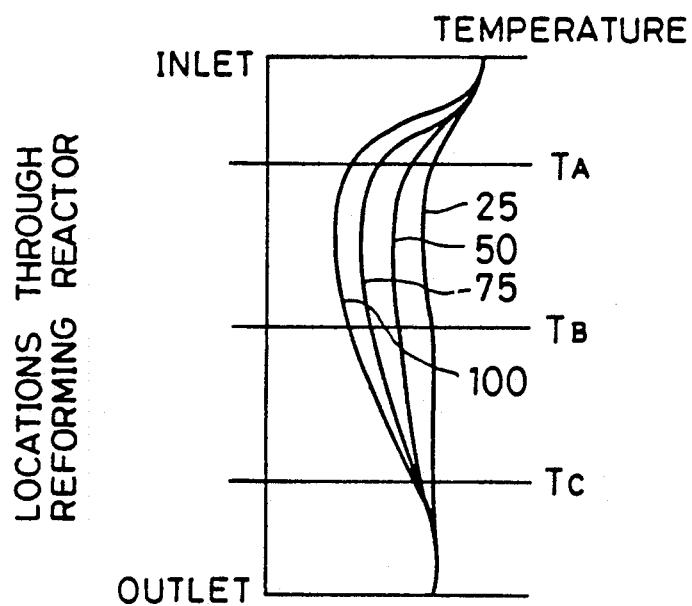
Figure 3C:
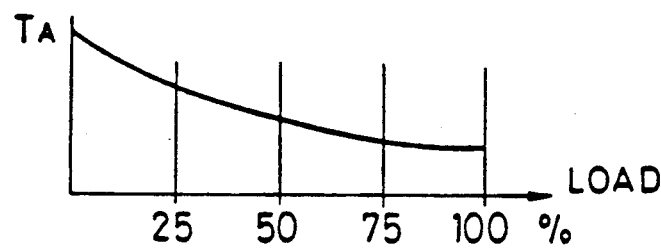
Figure 3C:
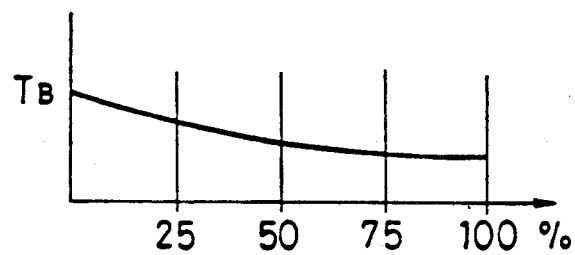
Figure 3C:
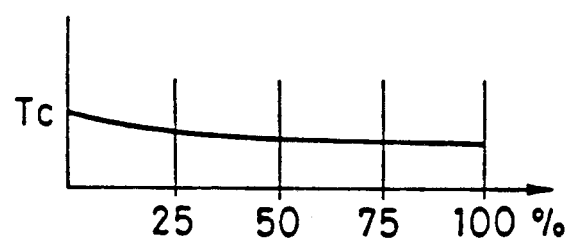
Figure 3C:
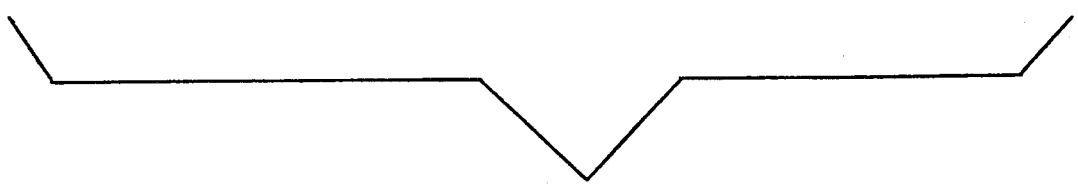
Figure 4:
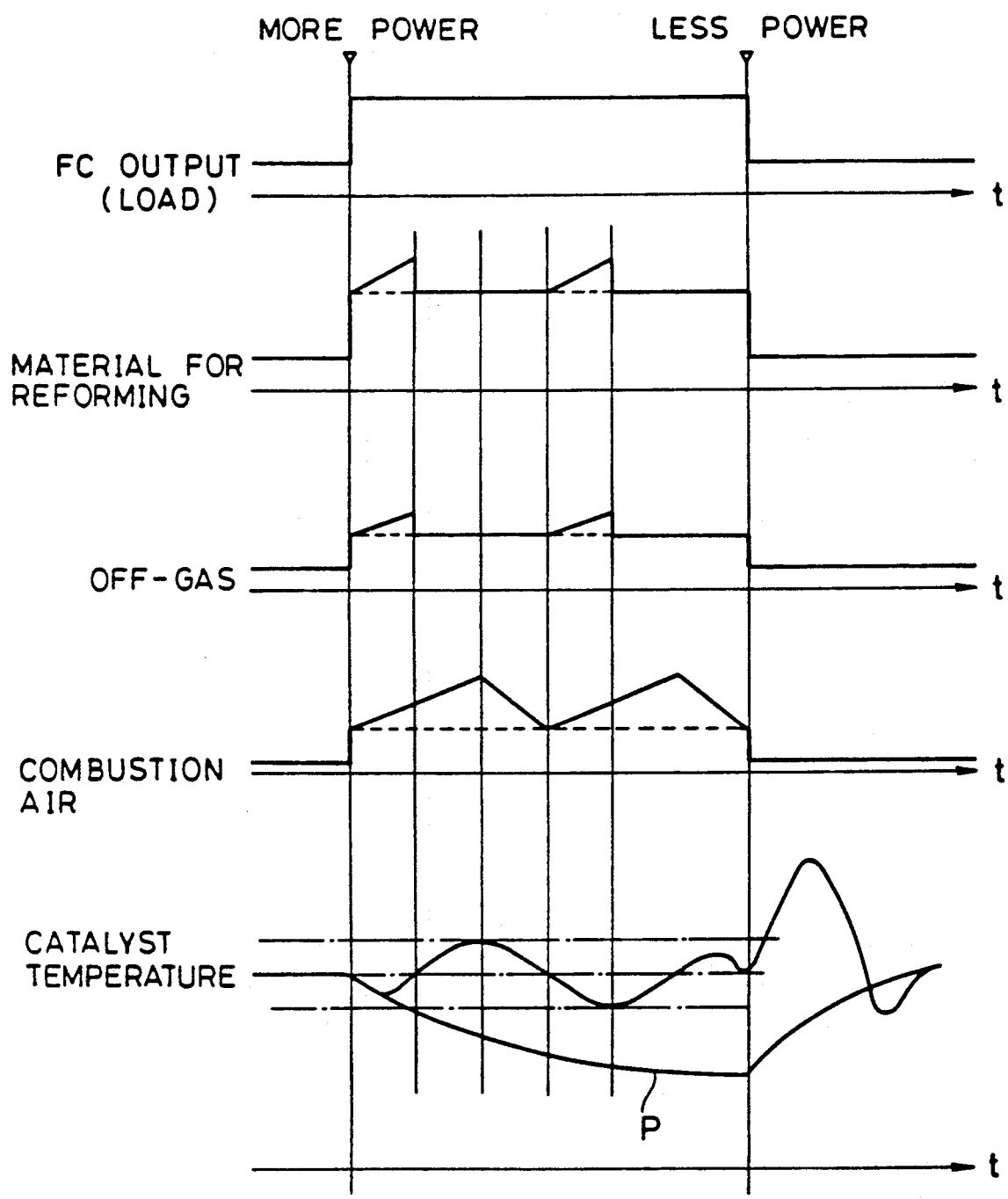
FIG. 4 is a timing chart that illustrates the operation of the apparatus shown in FIG. 1.

For example, let it assumed that the temperature at the point A in FIG. 3A is used as a reference for controlling the temperature of the catalyst 6, and data of the characteristics that defines the relationship between the varying load and the resulting catalyst temperatures may previously be set in a temperature setter 18 ($CT_5$). Then, in response to any increase in the load 5, the temperature setter 18 will issue a command signal 106 which represents the expected temperature of the reforming reaction catalyst 6 that will be reached at the point A.

The temperature as it is sensed by the temperature sensor 11 is the actual temperature that starts with the temperature sensed just before any change in the load occurs, and is gradually decreasing during the catalyst reaction followed by its endothermic reaction, as more material for reforming is being supplied. The temperature sensor 11 may employ a modified version of the general class K-type thermocouple according to "JIS C1610" (1981), which is designed for use as a fuel cell (as offered by Tokyo Netugaku Co., Ltd. Japan).

A signal 107 that represents any deviation between the command signal 106 and the signal 101 outputted from the temperature sensor 11 is given in FIG. 6. This deviation signal 107 is obtained by adding the two signals 101 and 106 in the adder 20. The signal 106 corresponds to the timing chart for the FC output (load) in FIG. 6, while the signal 101 corresponds to the timing chart for the catalyst temperature in FIG. 6. As the catalyst temperature varies with a time constant, the signal 107 which is indicative of the deviation between the signal 101 and 106 will vary sharply as shown in FIG. 6. This deviation signal 107 is then inputted to the temperature regulator ($CT_1$) 13 and to the comparator (CP) 19.

Figure 7:
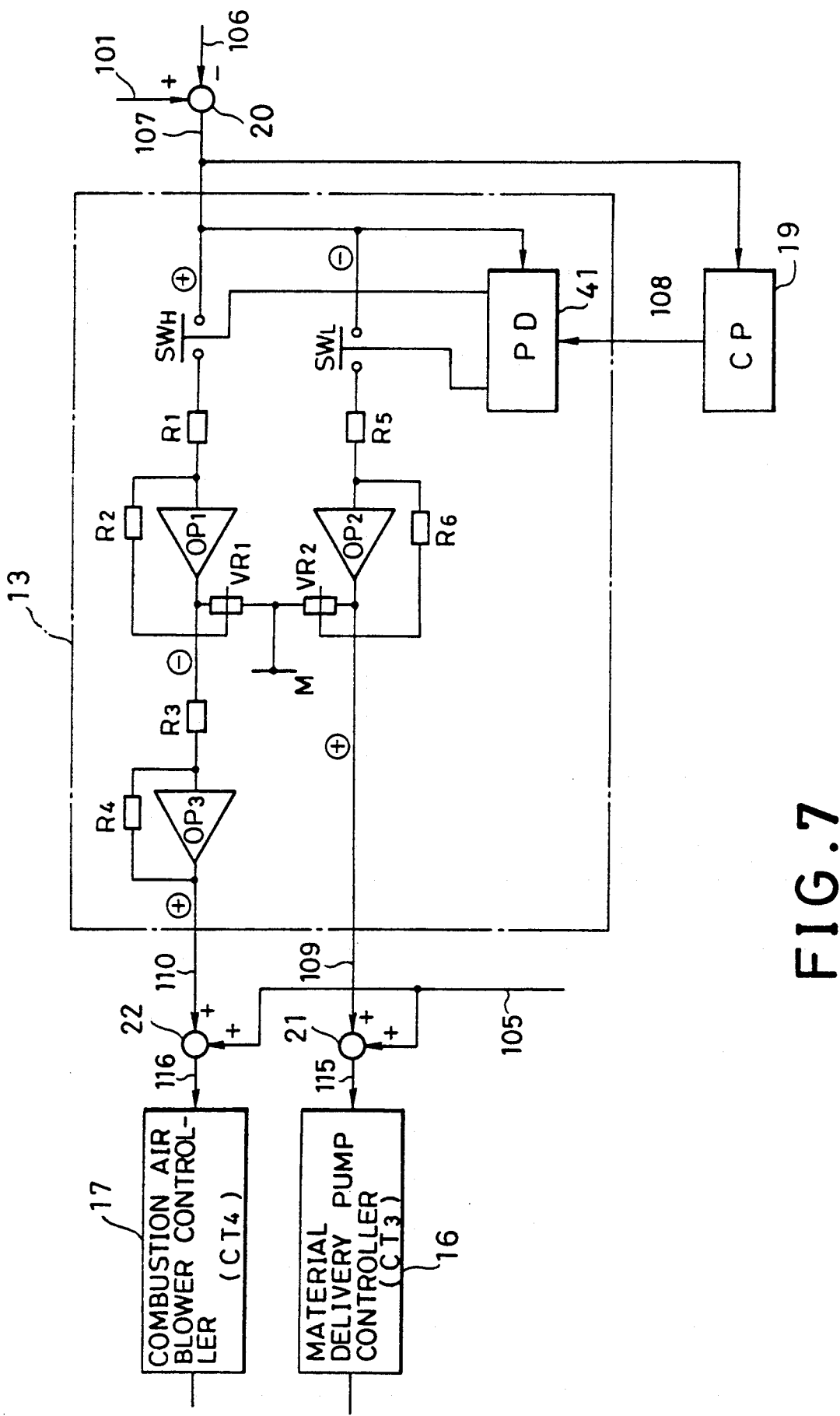
FIG. 7 is a schematic diagram showing the arrangement of a temperature regulator shown in FIG. 5A.

Referring next to FIG. 7, the arrangement of the temperature regulator 13 is shown. The (signal 107) value may be given by the following equation:

$$\text{(signal 107)} = \text{(signal}(+101)) + \text{(signal}(-106))$$

where the (signal 106) value depends upon the specific loads 5, and is given as a reference value. Specifically, when the current detector 14 detects a current, it is fed to the load regulator 15 where it is applied. Then, the output of the load regulator 15 is fed to the temperature setter 18, from which a reference temperature value is provided.

In the above equation, if (signal 101)>(signal 106), the signal 107 will have a positive value, and if (signal 101)<(signal 106), the signal 107 will have a negative value. The polarity of the signal 107 is determined by a polarity discriminator (PD) 41, which is set to turn switch $SW_H$ on if the polarity is positive, to turn switch $SW_L$ on if the polarity is negative, and to turn both switches $SW_H$ and $SW_L$ on if the signal 107 has a value of zero.

In addition, the polarity discriminator 41 will be locked when it receives a signal 108 from the comparator 19. Of course, switches $SW_H$ and $SW_L$ are both OFF when the lock signal 108 is ON.

Referring then to the timing chart in FIG. 6, the operation of the temperature regulator 13 is described. As the load 5 is increasing, the (signal 107) value is decreasing. When the (signal 107) value has reached the initial catalyst temperature point $T_1$, the comparator 19 is unlocked, starting the polarity discriminator 41 in FIG. 7. At this time, the signal 107 has a positive value, namely, $T_1 = T_S + \Delta T$. Consequently, switch $SW_H$ is turned on, and a signal 110 is provided through operational amplifiers $OP_1$ and $OP_2$.

The signal 110 is applied to the adder 22, which provides an output signal 116 to be fed to the combustion air blower controller 17. The combustion air blower controller 17 drives the combustion air blower 9 with an increasing number of revolutions, causing less off-gas to be produced so that the signal can have a value of $T_S$. Thus, the temperature of the reforming burner 8 is reduced, and the material for reforming 6 is cooled.

When the material for reforming 6 has been cooled, and the (signal 107) value has passed through $T_s$ to below $T_S$, switch $SW_L$ is turned on. At this time, switch $SW_H$ is OFF. When switch $SW_L$ is turned on, a signal 109 is provided through the operational amplifier $OP_2$. the signal 109 is inputted to the adder 21, which provides an output signal 115 to be inputted to the material delivery pump controller 16. The controller 16 drives the pump 2 with an increasing number of revolutions, causing more off-gas to be produced so that the signal 107 can have a value of $T_S$. Thus, the temperature of the burner 8 is raised, and the material for reforming 6 is heated.

When the load 5 has decreased, the temperature that has previously been set is modified to $T_S$. The catalyst temperature control sequence is started the moment that the (signal 107) value has passed $T_2'$. At this moment, the (signal 107) value has a negative polarity, namely, $T_2' = \Delta T + T_S'$.

When the comparator 19 is unlocked, the polarity discriminator 41 is enabled, turning switch $SW_L$ on since the (signal 107) value has a negative polarity. A signal 109 is provided through the operational amplifier $OP_2$. Then, the material delivery pump 2 is driven with more revolutions, and the material for reforming is heated until its temperature rises to $T_S$.

When the (signal 107) value has passed $T_S$, and has its polarity reversed to positive, switch $SW_H$ is turned on. Then, a signal 110 is provided through the operational amplifiers $OP_1$ and $OP_3$. This signal increases the number of revolutions for the combustion air blower 9, and the material for reforming 6 is cooled. Thus, its temperature is reduced. At this time, switch $SW_L$ is OFF.

The temperature setting $T_S = $ (signal 106) may be used as the reference value, and if any deviation between the reference value and (signal 101) value is positive, the number of revolutions for the blower 9 may be increased so that the catalyst 6 can be cooled, whereas if the deviation is negative, the number of revolutions for the pump 2 may be increased so that the catalyst 6 can be heated.

In FIG. 7, $VR_1$ and $VR_2$ are variable resistors, and $R_1$, and $R_2$, $R_3$, and $R_4$, $R_5$ and $R_6$ are resistors.

The CP 19 may be enabled to provide an output signal 108 when the value of the signal 107 has reached any of the deviation values between $T_1$ and $T_2$, and the temperature regulator 13 ($CT_1$) may be unlocked in response to the output signal 108. Then, when the deviation between the signal 106 and detect signal 101 is large, the temperature regulator 13 will not be enabled, and when it falls within the control range between $T_1$ and $T_2$, the temperature regulator 13 will be enabled, and the catalyst temperature control sequence will be started. The output signals 109 and 110 outputted from the temperature regulator 13 are fed to the respective adders 21 and 22 where they are added to the output signal 105 from the load regulator 15.

The control range between $T_1$ and $T_2$ may be determined on the basis of the output signal 106 of the temperature setter 18 which, for example, has the form of a comparator, or on the basis of the temperature Ts for the reforming reaction catalyst 6 that has been set when the load has a certain value. Usually, $T_1 = T_S + \Delta T$ and $T_2 = T_2 + \Delta T$, where $\Delta T = (5/100)T_S$.

When the load 5 varies, the temperature setting also changes from $T_S$ to $T_S'$. At this time, $T_1' = T_S' + \Delta T$ and $T_2' = T_S' + \Delta T$. The temperature of the reforming reaction catalyst 6 that will occur during its reaction is about 300° C., and therefore $\Delta T = 15°$ C.

The temperature of the reforming reaction catalyst 6 is controlled, so as to ensure that it will be kept constant, by increasing the rate of combustion air to be supplied when the temperature as sensed by the temperature sensor 11 is high, and, when it is low, by increasing the rate of material for reforming to be supplied, and thereby producing more off-gas to raise the temperature of the burner 8.

As the catalyst temperature is rising, therefore, the output signal 110 from the temperature regulator 13 will have a higher value, and the output signals 105 and 110 of the load regulator 15 will be inputted to the adder 22 where the sum of (signal 105)+(signal 110) will be obtained. This will enable the blower controller 17 to increase the number of revolutions for the motor associated with the blower 9. Then, the rate of combustion air to be supplied to the burner 8 will be increased, causing the temperature of the burner 8 to fall. This temperature will be sensed by the temperature sensor 11, and will be regulated to the appropriate value.

As the catalyst temperature is falling, the signal 109 will have a higher value, and the output signal 105 from the load regulator 15 and the sum signal of (signal 105)+(signal 109) from the adder 21 will enable the material delivery pump controller 16 to increase the number of revolutions for the motor associated with the pump 2. Then, the rate of material for reforming to be supplied to the reformer 1 will increase, causing the temperature of the burner 8 to be raised. This temperature will be sensed by the temperature sensor 11, and will be regulated to the appropriate value.

The output signal 106 of the temperature setter 18 will also have its value varying in response to the decreasing load 5, and the same temperature control sequence as described above will be started at the time when the signal 107 has fallen within its deviation range that triggers the control sequence.

Embodiment 2

Figure 8:
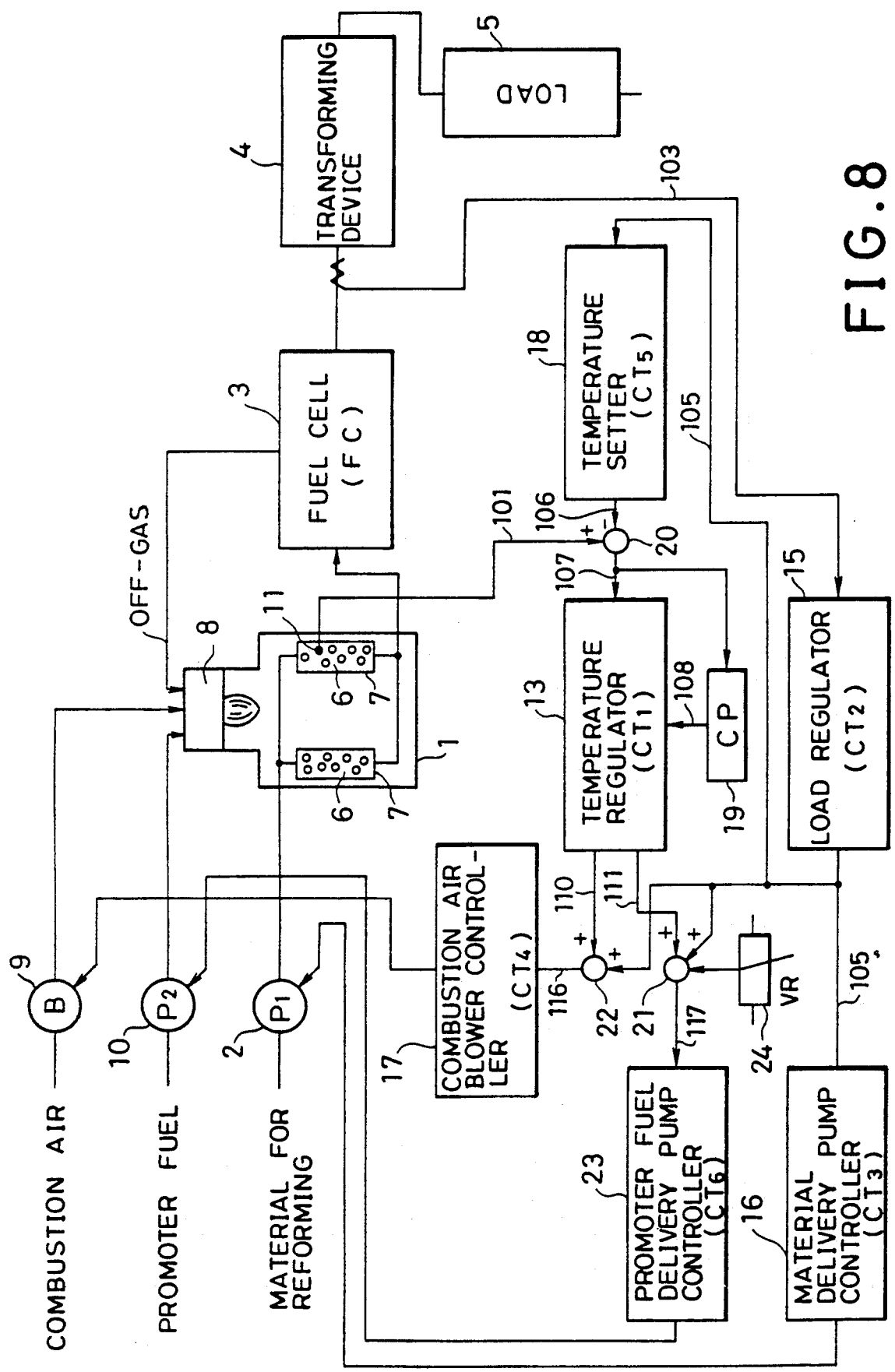
FIG. 8 is a schematic diagram showing the arrangement of the apparatus in a second preferred embodiment of the present invention that control the temperature by varying the rates of the promoter fuel and the combustion air to be supplied.
Figure 9:
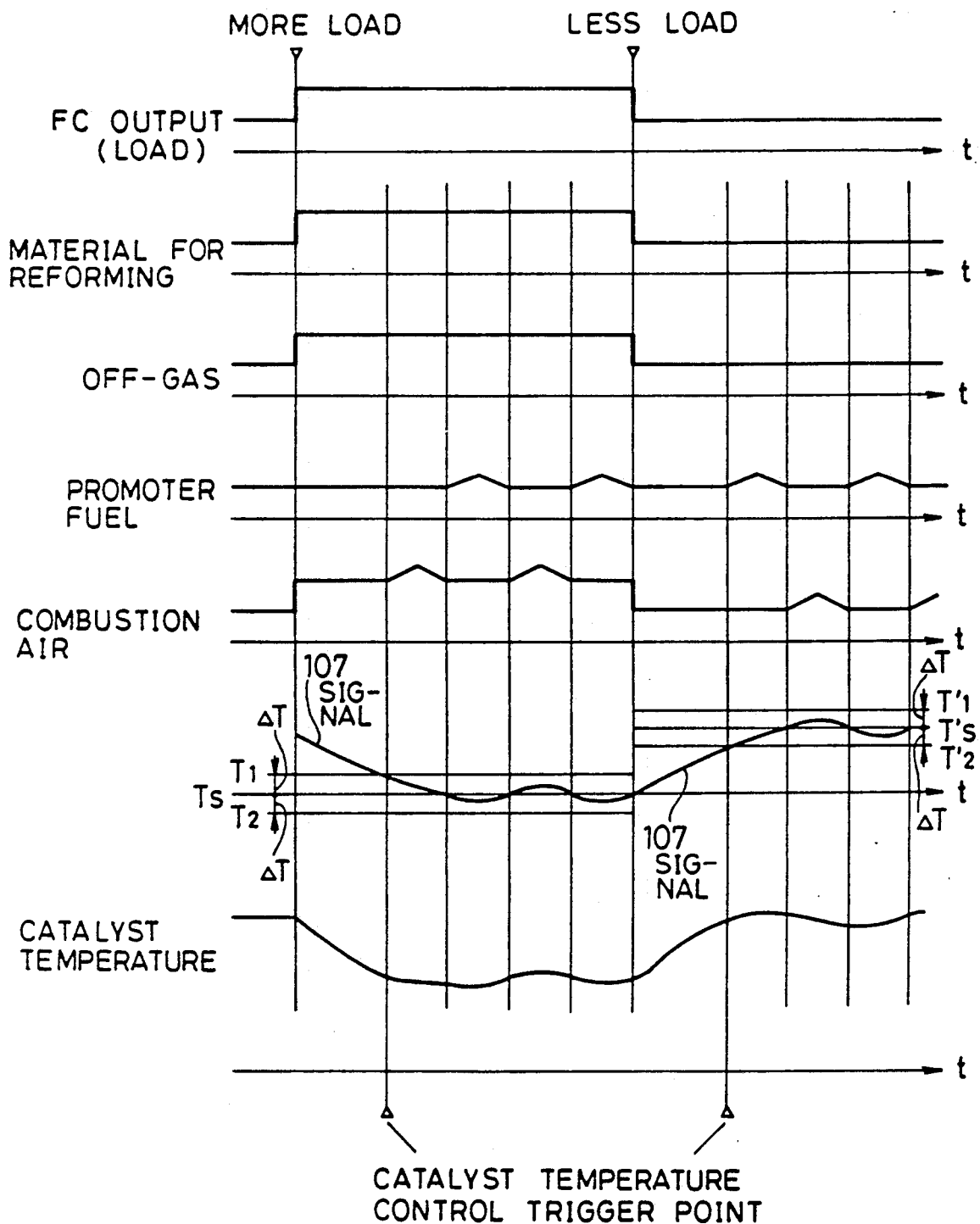
FIG. 9 is a timing chart illustrating the operation of the apparatus shown in FIG. 8.

Referring next to FIG. 8, shown is the arrangement of a second preferred embodiment of the present invention. In FIG. 9, the timing chart is provided for the second embodiment. Those locations in FIG. 8 which are similar to those in FIG. 5A are given the same reference numerals. The example shown in FIGS. 8 and 9 is specifically designed to control the catalyst temperature by varying the rates of promoter fuel and combustion air.

The term "promoted combustion" is to be understood to mean any appropriate method whereby the burning source such as the reformer burner 8 burns not only off-gas but also an additional fuel supplied from any different source through the promoter fuel delivery pump 10.

As it may be seen from FIG. 9, under a certain load condition, the amount of material for reforming that meets the FC output (load) requirements is supplied through the material delivery pump 2. When the catalyst 6 is at its high temperature, the number of revolutions for the motor associated with the blower 9 is increased so that more combustion air can be supplied to the reformer burner 8. This will reduce the temperature of the burner 8. By reducing the burner's temperature in this way, the temperature of the catalyst 6 may be regulated to the appropriate temperature.

When the catalyst 6 is at its low temperature, the number of revolutions for the motor associated with the promoter fuel delivery pump 10 will be increased so that more promoter fuel can be supplied to the reformer burner 8. Thus, the temperature of the burner will be raised. The temperature as sensed by the temperature sensor 11 will be regulated to be kept at the appropriate value.

The output signal 105 from the load regulator 15 is input to the material delivery pump controller 16 which determines the appropriate number of revolutions for the motor associated with the pump 2. This will determine the appropriate amount of material to be supplied to the reformer 1. In this second embodiment, the amount of material for reforming to be supplied will depend upon the varying load conditions. This means that the amount of off-gas will also depend upon the varying load conditions.

The output signal 105 from the load regulator 15 and the output signal 110 from the temperature regulator 13 are both inputted to the adder 22 where the two output signals are summed. The resulting signal is applied through the blower controller 17 to the combustion air blower 9. Thus, the appropriate amount of air to be supplied to the burner 8 will be determined.

The output signal 105 from the load regulator 15 and the output signal 111 from the temperature regulator 13 are inputted to the adder 21 where the two output signals are summed, and the resulting signal is provided through a promoter fuel controller 23 to the promoter fuel delivery pump 10. The appropriate amount of air to be supplied to the reformer burner 8 is then determined. The promoter fuel controller 23 is configured similarly to the material delivery pump controller 16 shown in FIG. 5B. The function of promoter fuel bias setter 24 is to allow the promoter fuel delivery pump 10 to constantly deliver an appropriate amount of promoter fuel to the reformer burner 8.

As it may be understood from the above description and from FIG. 8, the temperature of the catalyst 6 may be regulated to a value that will be able to meet the particular load requirements, by supplying the appropriate amount of promoter fuel and combustion air to the burner 8. It should also be noted that in the present embodiment, the temperature control sequence for the catalyst 6 will be triggered when the value of the signal 107 has fallen within its control range. The temperature control sequence provided by the temperature regulator 13 will proceed in the same manner as for the first embodiment.

It may be appreciated that any of the methods that have been described with reference to the embodiments allows the temperature of the catalyst to be regulated to any appropriate value to meet the particular load requirements, considering that the catalytic reaction is followed by the endothermic reaction. Thus, any excessive combustion that might otherwise occur in the reforming burners can advantageously be eliminated. Any of the methods also allows the temperature control to proceed at the equilibrium point of the endothermic reaction following the catalytic reaction, thus minimizing any variation in the temperature. Any temperature overshoot condition that might possibly occur under the light load condition can advantageously be reduced. Thus, any type of catalyst that may be used for the purposes of the present invention can retain its life or usability as long as possible.

As described, the present invention allows the catalyst temperature setting value to be modified to meet the specific load requirements, considering that the catalytic reaction is followed by the endothermic reaction, thereby reducing the burning that occurs in the reformer burner and increasing the running efficiency of the plant facilities. It also allows the temperature control sequence to be performed near the equilibrium point of the endothermic reaction, thus minimizing any possible variations in the temperature. Furthermore, any temperature overshoot condition that might occur under light load conditions and degrade the performance of the catalyst may advantageously be reduced or completely eliminated.

An additional advantage of the present invention is that the temperature control sequence will not be triggered until any deviation between the particular temperature setting value for the catalyst and the actual temperature value as sensed by the temperature sensor has fallen within its control range. When the catalyst has a large thermal time constant, it may cause a delay in the timing at which the temperature should be varied. In this situation, the control could be unstable and reliable. According to the present invention, however, such situation will be avoided.

Although the present invention has been described with reference to the several preferred embodiments thereof, it should be understood that various changes and modifications may be made without departing from the spirit and scope of the invention.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A reforming reaction catalyst temperature control method in which a reforming gas to be supplied to a fuel cell is produced by allowing said reforming gas to react against a reforming reaction catalyst, so that the fuel cell can provide output power to be supplied to a load, said method comprising the steps of:
   detecting the temperature of said reforming reaction catalyst during said catalytic reaction process;
   detecting any current flow from said fuel cell to said load;
   setting a value for said catalyst temperature that may vary depending upon the load condition, as well as setting a range of temperatures determined from the set value for said catalyst temperature on the basis of a relationship between variations in the load condition and the corresponding variations in said catalyst temperature;
   determining any deviation that occurs between the set value for said catalyst temperature and the detected catalyst temperature by calculating said deviation; and
   controlling the temperature for said catalyst when said deviation has fallen within said range of temperatures.

2. A method as claimed in claim 1, wherein said step of detecting the temperature of the reforming reaction catalyst includes sensing said temperature by using a thermocouple.

3. A method as claimed in claim 1, wherein said step of detecting any current flow from said fuel cell to said load includes detecting said any current flow by means of a Hall CT.

4. A method as claimed in claim 1, wherein said step of controlling said temperature for said reforming reaction catalyst includes controlling said temperature by using means that includes a temperature regulator, a material for reforming delivery pump controller and a combustion air blower controller.

5. A method as claimed in claim 4, wherein said temperature regulator includes a polarity discriminator and a plurality of operational amplifiers.

6. A method as claimed in claim 4, wherein each of said material for reforming delivery pump controller and said combustion air blower controller comprises an arithmetic element, a pulse width modulator and a power element.

7. A method as claimed in claim 6, wherein said arithmetic element comprises a function generator in the form of CPU, an operational amplifier and a resistor.

8. A method as claimed in claim 1, wherein said step of controlling the temperature control sequence for said reforming reaction catalyst is performed by using means that includes a temperature regulator, a promoter fuel delivery pump controller and a combustion air blower controller.

9. A method as claimed in claim 8, wherein said temperature regulator includes a polarity discriminator and a plurality of operational amplifiers.

10. A method as claimed in claim 8, wherein each of said promoter fuel delivery pump controller and said combustion air blower controller comprises an arithmetic element, a pulse width modulator and a power element.

11. A method as claimed in claim 10, wherein said arithmetic element comprises a function generator in the form of CPU, an operational amplifier and a resistor.

12. A reforming reaction catalyst temperature control apparatus in which a reforming gas to be supplied to a fuel cell is produced by allowing said reforming gas to react against a reforming reaction catalyst, so that the fuel cell can provide output power to be supplied to a load, said apparatus comprising:

first detector means for detecting the temperature of the reforming reaction catalyst during the catalytic reaction process;

second detector means for detecting any current flow from said fuel cell to said load;

means for setting a value for said catalyst temperature that may vary depending upon the load condition, as well as for setting a range of temperatures determined from the set value for said catalyst temperature on the basis of a relationship between variations in the load condition and the corresponding variations in said catalyst temperature;

means for determining any deviation that occurs between the set value for said catalyst temperature and the detected catalyst temperature by calculating said deviation; and means for controlling the temperature for said catalyst when said any deviation has fallen within said range of temperatures.

13. An apparatus as claimed in claim 12, wherein said first detector means is a thermocouple.

14. An apparatus as claimed in claim 12, wherein said second detector means is a Hall CT.

15. An apparatus as claimed in claim 12, wherein said means for controlling of said temperature includes a temperature regulator, a reforming material delivery pump controller and a combustion air blower controller.

16. An apparatus as claimed in claim 15, wherein said temperature regulator includes a polarity discriminator and a plurality of amplifiers.

17. An apparatus as claimed in claim 15, wherein each of said reforming material delivery pump controller and said combustion air blower controller comprises an arithmetic element, a pulse width modulator and a power element.

18. An apparatus as claimed in claim 17, wherein said arithmetic element comprises a function generator in the form of CPU, operational amplifier and a resistor.

19. An apparatus as claimed in claim 12, wherein said means for controlling said temperature includes a temperature regulator, a promoter fuel delivery pump controller and a combustion air delivery blower controller.

20. An apparatus as claimed in claim 19, wherein said temperature regulator includes a polarity discriminator and a plurality of operational amplifiers.

21. An apparatus as claimed in claim 19, wherein each of said reforming material delivery pump controller and said combustion air blower controller comprises an arithmetic element, a pulse width modulator and a power element.

22. An apparatus as claimed in claim 21, wherein said arithmetic element comprises a function generator, an operational amplifier and a resistor.

* * * * *